US012730327B2

(12) United States Patent
Sun et al.

(10) Patent No.: US 12,730,327 B2
(45) Date of Patent: Sep. 8, 2026

(54) DATA PROCESSING METHOD, SYSTEM, AND APPARATUS, DEVICE, STORAGE MEDIUM, AND PROGRAM PRODUCT

(71) Applicant: Okra Glass Co., Ltd., Shanghai (CN)

(72) Inventors: Xin Sun, Shanghai (CN); Bo Liu, Shanghai (CN)

(73) Assignee: OKRA GLASS CO., LTD., Shanghai (CN)

( * ) Notice: Subject to any disclaimer, the term of this patent is extended or adjusted under 35 U.S.C. 154(b) by 0 days.

(21) Appl. No.: 19/081,369

(22) Filed: Mar. 17, 2025

(65) Prior Publication Data

US 2025/0383548 A1 Dec. 18, 2025

(30) Foreign Application Priority Data

Jun. 18, 2024 (CN) ......................... 202410790721.0

(51) Int. Cl.

| | |
|---|---|
| ***G02B 27/01*** | (2006.01) |
| ***G06F 3/01*** | (2006.01) |
| ***G06T 15/00*** | (2011.01) |

(52) U.S. Cl.
CPC .......... *G02B 27/0176* (2013.01); *G06F 3/011* (2013.01); *G06T 15/00* (2013.01)

(58) Field of Classification Search
None
See application file for complete search history.

(56) References Cited

U.S. PATENT DOCUMENTS

2023/0306499 A1* 9/2023 Paterson ................ G06V 20/20

* cited by examiner

*Primary Examiner* — Aneeta Yodichkas
(74) *Attorney, Agent, or Firm* — DUANE MORRIS LLP

(57) ABSTRACT

Provided are a data processing method, system, and apparatus, a device, a storage medium, and a program product. The method includes fastening the smart wearable device to glasses worn by a target object; determining a target function mode; acquiring first image information captured from the viewpoint of the target object and/or first voice information of the target object based on the target function mode; receiving data processing result information corresponding to the target function mode based on the first image information and/or the first voice information; and executing the data processing result information.

7 Claims, 8 Drawing Sheets

S710

In response to receiving first image information and/or first voice information corresponding to the target function mode sent by the smart wearable device, perform a third processing on the first image information and/or the first voice information to obtain data processing result information corresponding to the target function mode; or receive the data processing result information corresponding to the target function mode based on the first image information and/or the first voice information

S720

Return the data processing result information corresponding to the target function mode to the smart wearable device

FIG. 7

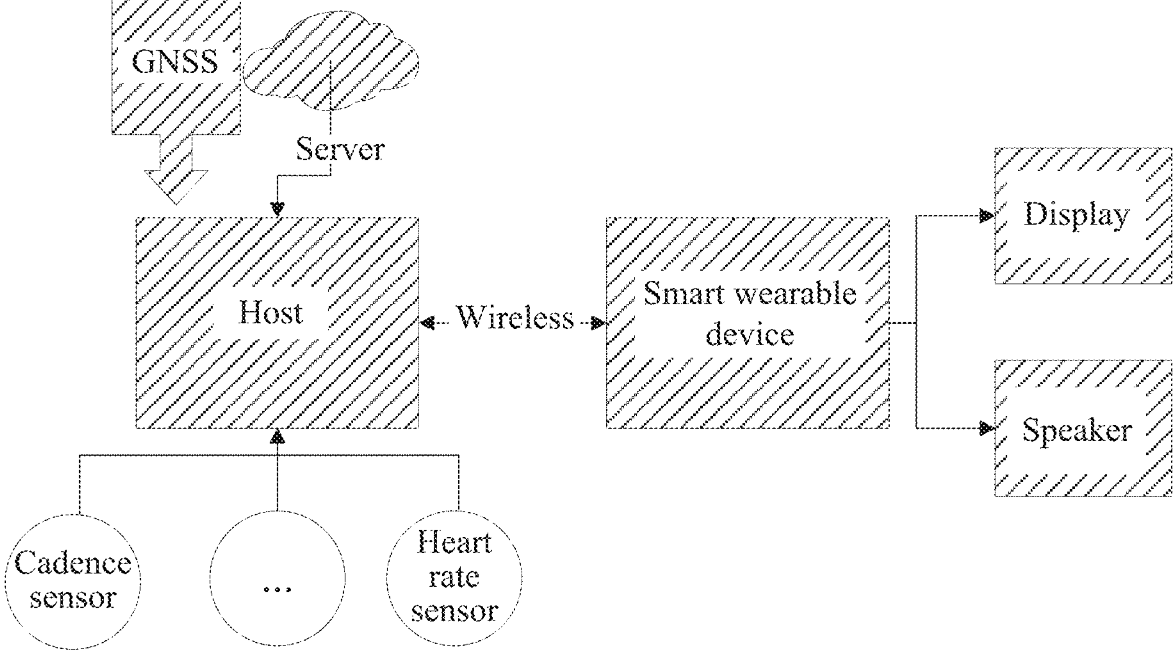

FIG. 8

DATA PROCESSING METHOD, SYSTEM, AND APPARATUS, DEVICE, STORAGE MEDIUM, AND PROGRAM PRODUCT

CROSS-REFERENCE TO RELATED APPLICATION

This application claims priority to Chinese Patent Application No. 202410790721.0 filed Jun. 18, 2024, the disclosure of which is incorporated herein by reference in its entirety.

TECHNICAL FIELD

This disclosure relates to the field of data processing technologies, particularly a data processing method, system, and apparatus, a device, a storage medium, and a program product.

BACKGROUND

With the rapid development of science and technology, the augmented reality (AR) technology has gradually penetrated into people's daily life to provide users with new information interaction experience.

As smart devices that utilize the augmented reality technology to combine virtual information with the real world, smart wearable devices have been widely applied in fields such as gaming, entertainment, and education. However, existing smart wearable devices in the related art still have limitations in terms of application scenarios and data processing, thus failing to meet the needs of users, resulting in a lower user experience.

SUMMARY

This disclosure provides a data processing method, system, and apparatus, a device, a storage medium, and a program product, improving the data processing accuracy of a smart wearable device and improving the user experience.

In a first aspect, an embodiment of this disclosure provides a data processing method. The method is applied to a smart wearable device. The method includes fastening the smart wearable device to glasses worn by a target object; determining a target function mode; acquiring first image information captured from the viewpoint of the target object and/or first voice information of the target object based on the target function mode; receiving data processing result information corresponding to the target function mode based on the first image information and/or the first voice information; and executing the data processing result information.

In a second aspect, an embodiment of this disclosure provides a data processing method. The method is applied to a host. The method includes: in response to receiving first image information and/or first voice information corresponding to the target function mode sent by a smart wearable device, performing a third processing on the first image information and/or the first voice information to obtain data processing result information corresponding to the target function mode; or receiving the data processing result information corresponding to the target function mode based on the first image information and/or the first voice information; and returning the data processing result information corresponding to the target function mode to the smart wearable device.

In a third aspect, an embodiment of this disclosure provides a data processing method. The method is applied to a cloud. The method includes: in response to receiving first image information and/or first voice information corresponding to the target function mode sent by a host, performing a fourth processing on the first image information and/or the first voice information to obtain data processing result information corresponding to the target function mode, where the first voice information is voice information denoised by the host; and returning the data processing result information corresponding to the target function mode to the host.

In a fourth aspect, an embodiment of this disclosure provides a data processing system. The system includes the smart wearable device, a host, and a cloud. The smart wearable device is configured to be fastened to the glasses worn by the target object. The smart wearable device is configured to acquire the first image information captured from the viewpoint of the target object and/or the first voice information of the target object based on the target function mode and send the first image information and/or the first voice information to the host. The host is configured to perform a third processing on the first image information and/or the first voice information to obtain the data processing result information corresponding to the target function mode and return the data processing result information to the smart wearable device; or forward the first image information and/or the first voice information to the cloud. The cloud is configured to perform a fourth processing on the first image information and/or the first voice information to obtain the data processing result information corresponding to the target function mode; and return the data processing result information to the host. The host is also configured to forward, to the smart wearable device, the data processing result information returned by the cloud. The smart wearable device is also configured to execute the data processing result information.

In a fifth aspect, an embodiment of this disclosure provides a data processing apparatus. The apparatus is applied to a smart wearable device. The smart wearable device is mounted on glasses worn by a target object. The apparatus includes a target function mode module, an acquisition module, a first receiving module, and an execution module.

The target function mode module is configured to determine a target function mode.

The acquisition module is configured to acquire first image information captured from the viewpoint of the target object and/or first voice information of the target object based on the target function mode.

The first receiving module is configured to receive data processing result information corresponding to the target function mode based on the first image information and/or the first voice information.

The execution module is configured to execute the data processing result information.

In a sixth aspect, an embodiment of this disclosure provides a data processing apparatus. The apparatus is applied to a host. The apparatus includes a third processing module, a second receiving module, and a first returning module.

The third processing module is configured to, in response to receiving first image information and/or first voice information corresponding to the target function mode sent by a smart wearable device, perform a third processing on the first image information and/or the first voice information to obtain data processing result information corresponding to the target function mode.

The second receiving module is configured to receive the data processing result information corresponding to the target function mode based on the first image information and/or the first voice information.

The first returning module is configured to return the data processing result information corresponding to the target function mode to the smart wearable device.

In a seventh aspect, an embodiment of this disclosure provides a data processing apparatus. The apparatus is applied to a cloud. The apparatus includes a fourth processing module and a second returning module.

The fourth processing module is configured to, in response to receiving first image information and/or first voice information corresponding to the target function mode sent by a host, perform a fourth processing on the first image information and/or the first voice information to obtain data processing result information corresponding to the target function mode, where the first voice information is voice information denoised by the host.

The second returning module is configured to return the data processing result information corresponding to the target function mode to the host.

In an eighth aspect, an embodiment of this disclosure provides an electronic device. The electronic device includes one or more processors and a storage device configured to store one or more programs. When executed by the one or more processors, the one or more programs cause the one or more processors to perform the data processing method of any embodiment of this disclosure.

In a ninth aspect, an embodiment of this disclosure provides a storage medium. The storage medium includes computer-executable instructions which, when executed by a computer processor, cause the computer processor to perform the data processing method of any embodiment of this disclosure.

In a tenth aspect, an embodiment of this disclosure provides a computer program product. The computer program product includes a computer program which, when executed by a processor, causes the processor to perform the data processing method of any embodiment of this disclosure.

BRIEF DESCRIPTION OF DRAWINGS

The preceding and other features, advantages, and aspects of embodiments of this disclosure become more apparent with reference to the embodiments described below in conjunction with the drawings. The same or similar reference numerals throughout the drawings denote the same or similar elements. It is to be understood that the drawings are illustrative and that originals and elements are not necessarily drawn to scale.

FIG. 7 is a flowchart of a data processing method according to an embodiment of this disclosure.

FIG. 8 is a flowchart of data processing according to an embodiment of this disclosure.

DETAILED DESCRIPTION

Figure 1:
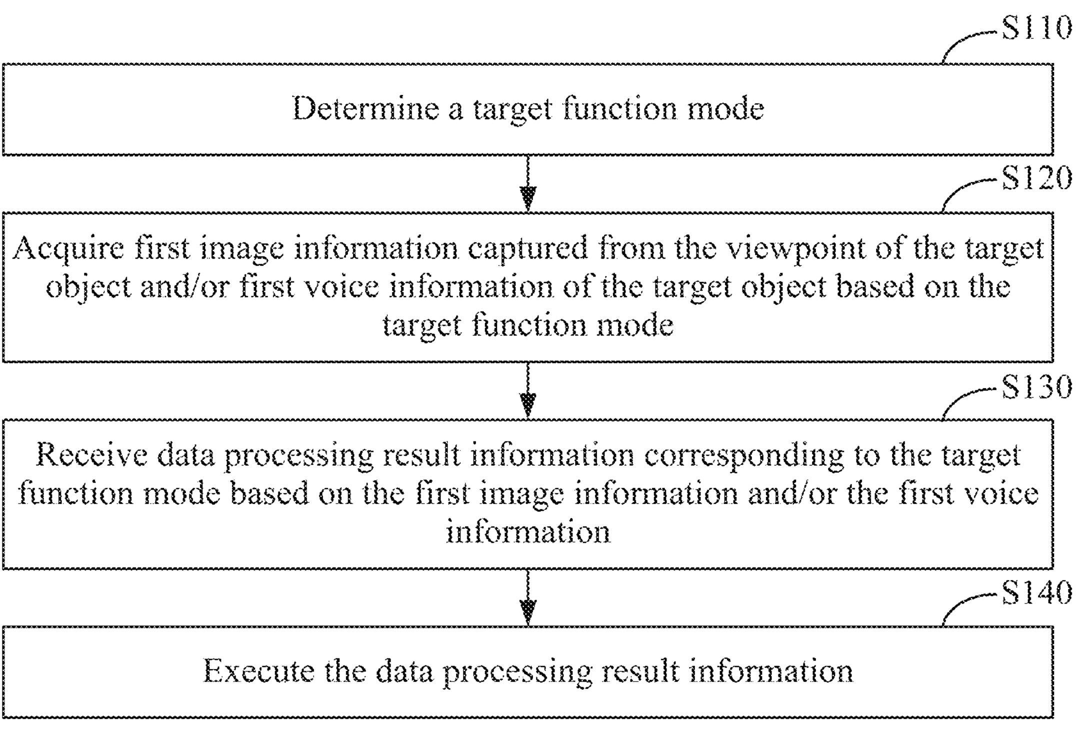
FIG. 1 is a flowchart of a data processing method according to an embodiment of this disclosure.

Embodiments of this disclosure are described in more detail hereinafter with reference to the drawings. Although some embodiments of this disclosure are shown in the drawings, it is to be understood that this disclosure may be implemented in various forms and should not be construed as being limited to the embodiments set forth herein. Rather, these embodiments are provided so that this disclosure can be thoroughly and completely understood. It is to be understood that the drawings and embodiments of this disclosure are merely illustrative and are not intended to limit the scope of this disclosure.

It is to be understood that the various steps recorded in the method embodiments of this disclosure may be performed in a different order, and/or in parallel. Additionally, the method embodiments may include additional steps and/or omit some of the illustrated steps. The scope of this disclosure is not limited in this respect. The term "include" and variations thereof used herein refer to "including, but not limited to". It is to be noted that concepts such as "first" and "second" used herein are intended to distinguish between apparatuses, modules or units and not to limit the order of or dependency between functions performed by the apparatuses, modules or units. It is to be noted that "one" or "multiple" in this disclosure is illustrative and non-limiting and that those skilled in the art should understand that "one" or "multiple" is interpreted as "one or more" unless otherwise specified in the context. It is to be understood that data (including, but not limited to, the data itself and acquisition or use of the data) involved in the solutions should comply with corresponding laws and regulations and relevant provisions.

FIG. 1 is a flowchart of a data processing method according to an embodiment of this disclosure. This embodiment of this disclosure is applicable to various scenarios where the smart wearable device is used. In this embodiment, the smart wearable device is not limited. The smart wearable device may be, for example, AR glasses, virtual reality (VR) glasses, mixed reality (MR) glasses, or extended reality (XR) glasses. The target object may be understood as a user wearing the smart wearable device. The target object may also be referred to as a wearer or a user. The method may be performed by a data processing apparatus applied to the smart wearable device. The apparatus may be implemented by software and/or hardware. Optionally, the apparatus is implemented by an electronic device. The electronic device may be, for example, a mobile terminal, a PC terminal, or a server. As shown in FIG. 1, the method includes the following steps.

It is to be noted that the following embodiments are applicable to the smart wearable device.

In S110, a target function mode is determined.

In this embodiment, the target function mode is not limited. The target function mode may be, for example, cycling, taxi, navigation, meal ordering, shopping, or recording. The recording function mode may be understood as recording an image, a voice, and time. The recording function mode may include conference recording, alarm clock reservation, and time schedule reservation. In this embodiment, the target function mode of the smart wearable device may be determined in various manners, for example, voice or touch. Optionally, determining the target function mode includes determining the target function mode in at least one of the following manners: smart wearable device touch control information, smart wearable device voice control information, or host operation control information. The smart wearable device touch control information includes control information sent by touching a touch area set in the smart wearable device. The host operation control information includes at least one of the following: host touch control information, host button control information, or host voice control information.

The set touch area may be understood as a touch area corresponding to the touchpad. The smart wearable device voice control information may be understood as that the user controls the smart wearable device by using a voice instruction. The host touch control information may be understood as control information sent when the user touches a host screen. The host button control information may be understood as control information sent when a physical or virtual button on a host is pressed. The host voice control information may be understood as controlling the host through a voice instruction, thereby controlling the target function mode of the smart wearable device through the host.

In this embodiment, the target function mode may be determined by the smart wearable device touch control information or the smart wearable device voice control information. The smart wearable device touch control information includes control information sent by touching a touch area set in the smart wearable device. The target function mode may be determined by the host touch control information, the host button control information, or the host voice control information.

In this embodiment, the target function mode of the smart wearable device may be determined in multiple manners to provide flexible and diversified operation experience for the user.

Figure 2:
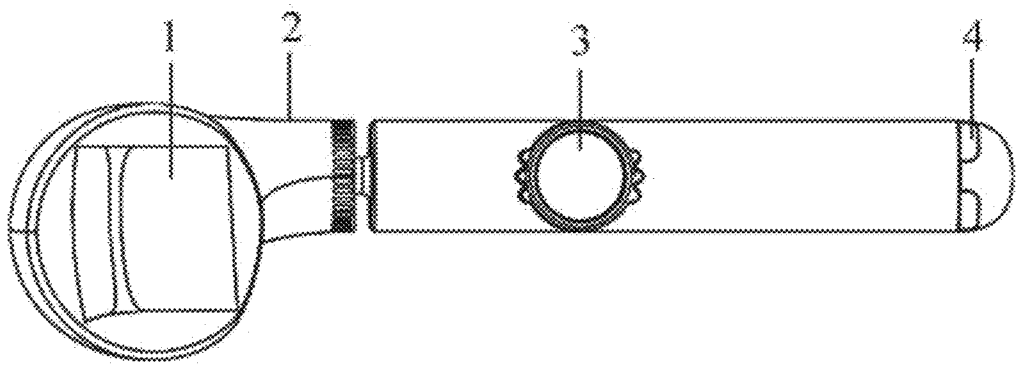
FIG. 2 is a diagram illustrating the effect of a smart wearable device according to an embodiment of this disclosure.
Figure 3:
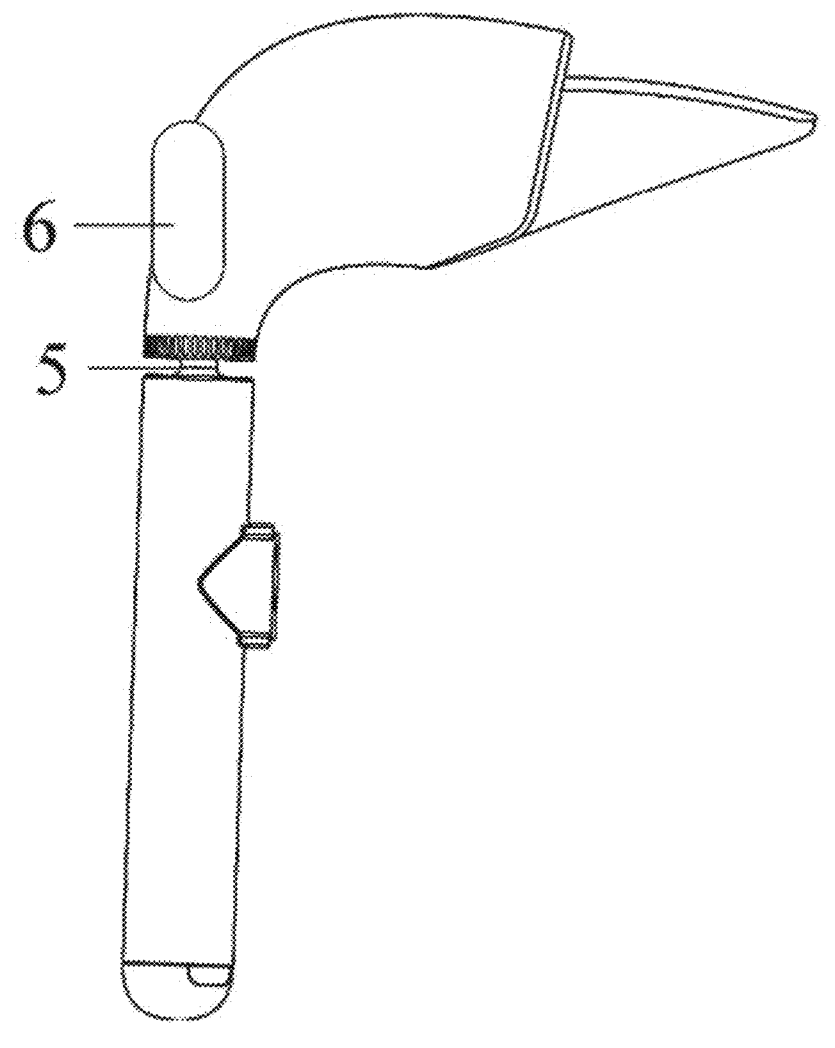
FIG. 3 is a diagram illustrating the effect of a smart wearable device according to an embodiment of this disclosure.
Figure 4:
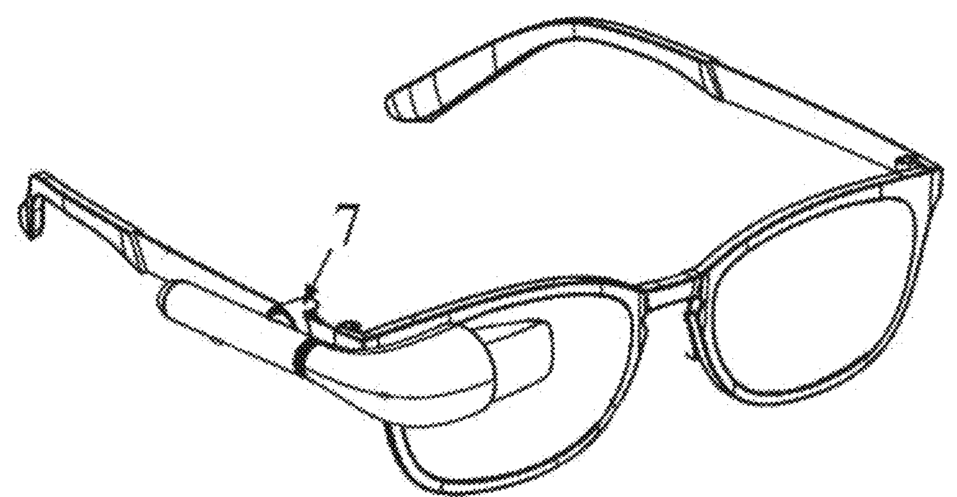
FIG. 4 is a diagram illustrating the effect of a smart wearable device fastened to glasses according to an embodiment of this disclosure.

FIG. 2 is a diagram illustrating the effect of a smart wearable device according to an embodiment of this disclosure. As shown in FIG. 2, the smart wearable device includes an eyepiece 1, a microphone 2, a magnetic track 3, and a charging contact 4. The smart wearable device is charged by the storage case (in contact with an electrode in the storage case) through the charging contact 4. The smart wearable device can also communicate with the storage case through the charging contact 4, for example, transmit power information and upgrade information. The magnetic track 3 is configured to provide support and stability for adjustment of the smart wearable device so that the smart wearable device can be secured to a glasses temple and does not fall off or loosen during bumping, swinging, or toggling. FIG. 3 is a diagram illustrating the effect of a smart wearable device according to an embodiment of this disclosure. As shown in FIG. 3, the smart wearable device also includes a universal rotary shaft 5 and a touch area 6. Corresponding control information can be generated by touching the touch area 6. Through the universal shaft, the eyepiece can rotate up, down, left and right. FIG. 4 is a diagram illustrating the effect of a smart wearable device fastened to glasses according to an embodiment of this disclosure. This embodiment does not limit the glasses. The glasses may be, for example, myopia glasses, hyperopia glasses, sunglasses, tinted glasses, or eyeglass frames. In FIG. 4, the base 7 is combined with the magnetic track 3 on the side of the tail of the smart wearable device so that the smart wearable device can be secured to the glasses temple. During assembly, the magnetic attraction of a magnet in the magnetic track helps better align the position of the base, enabling installation in place without the need to remove the glasses to check the position of the base.

In S120, first image information captured from the viewpoint of the target object and/or first voice information of the target object is acquired based on the target function mode.

In this embodiment, it is feasible to, based on the target function mode, use a camera or an image sensor built in the smart wearable device to acquire the first image information captured from the viewpoint of the target object and/or use a microphone or an audio sensor built in the smart wearable device to acquire the first voice information of the target object.

In this embodiment, the direction in which the camera or the image sensor acquires an image aligns with the direction of the eyepiece while the microphone or the audio sensor is oriented inward, thereby achieving better sound pickup and reducing the impact of wind noise.

Illustratively, if the triggered target function mode is a navigation mode, the first image information may include environment information such as a road, a traffic sign, an intersection, and a building ahead of the target object. The first image information helps the smart wearable device provide accurate navigation guidance. Additionally, the first voice information may include a voice instruction corresponding to the navigation mode, for example, “navigate to location A” or “how many kilometers are left to the destination”.

If the triggered target function mode is a cycling motion mode, the first image information may include, for example, road conditions and traffic conditions ahead of the target object. The first image information helps the target object understand the surrounding environment, ensuring the cycling safety. Additionally, the first voice information may include a voice instruction corresponding to the cycling motion mode. The voice instruction is configured to control the cycling motion mode and query cycling information such as “start cycling”, “pause”, “how many kilometers have I cycled”, or “what is my cycling speed”.

If the triggered target function mode is a taxi mode, the first image information may include environment information of the location of the target object, such as a street, a building, and a vehicle. The first image information helps a taxi application to more accurately locate the target object and dispatch a vehicle. Additionally, the first voice information may include a voice instruction corresponding to the taxi mode, for example, “call a taxi”, “cancel the order”, or “take me to location A”.

If the triggered target function mode is a meal ordering mode, the first voice information may include a voice instruction corresponding to the meal ordering mode, such as "open the online ordering app". If the triggered target function mode is a shopping mode, the first voice information may also include a voice instruction corresponding to the shopping mode, such as "open the shopping app", "search for glasses", "next page", or "add to cart". If the triggered target function mode is a translation mode, the first image information may include to-be-translated text and image information, such as a picture of an English paper or an English traffic sign; and the first voice information may include a voice instruction corresponding to the translation mode, such as "please translate the following paragraph", "please translate the text on the traffic sign ahead", or "please translate the text in the first image information". In the translation mode, it is feasible to trigger the image acquisition function based on the first voice information and translate the text in the acquired first image information or it is feasible to translate only the to-be-translated voice in the first voice information.

In S130, data processing result information corresponding to the target function mode is received based on the first image information and/or the first voice information.

In this embodiment, if the first image information and/or the first voice information is acquired in the corresponding target function mode, the first image information and/or the first voice information is sent to the corresponding host. The host generates the data processing result information corresponding to the target function mode based on the first image information and/or the first voice information and feeds back the data processing result information to the smart wearable device. The smart wearable device receives the data processing result information. Alternatively, the host forwards the first image information and/or the first voice information to a cloud. The cloud generates the data processing result information based on the first image information and/or the first voice information and forwards the data processing result information to the smart wearable device through the host. The smart wearable device receives the data processing result information.

The data processing result information includes at least one of the following: target image information, target text information, target instruction information, or target audio information.

Illustratively, the target image information may be, for example, a route image in the target function mode or a road condition image in the cycling motion mode. The target text information may be translation result information in the translation mode, text recognized from an image, or commodity or dish information in the shopping or ordering mode. The target instruction information may include a navigation steering instruction, a cycling start/pause instruction, or a shopping cart adding instruction. The target audio information may include voice synthesis information, for example, audio information converted from target text information. The target audio information may also include a prompt tone, for example, a confirmation tone or a warning tone for prompting a user operation.

Optionally, receiving the data processing result information corresponding to the target function mode based on the first image information and/or the first voice information includes performing a first processing on the first image information to obtain second image information; performing a second processing on the first voice information to obtain second voice information; and receiving the data processing result information corresponding to the target function mode based on the second image information and/or the second voice information.

In this embodiment, a central processing unit (CPU) in the smart wearable device performs image encoding and image compression in sequence on the first image information to obtain second image information, performs voice encoding on the first voice information to obtain second voice information, and sends the second image information and/or the second voice information to the corresponding host via a wireless transmission method (such as Bluetooth). The host generates the data processing result information corresponding to the target function mode based on the second image information and/or the second voice information and feeds back the data processing result information to the smart wearable device. The smart wearable device receives the data processing result information. Alternatively, the host forwards the second image information and/or the second voice information to the cloud. The cloud generates the data processing result information based on the second image information and/or the second voice information and forwards the data processing result information to the smart wearable device through the host. The smart wearable device receives the data processing result information.

The image encoding may be understood as converting the first image information into a format more suitable for storage or transmission. The voice encoding may be understood as a process of converting the first voice information into digital data to facilitate, for example, storage and transmission.

In this embodiment, the second image information obtained from the first processing on the first image information saves more storage space and requires less bandwidth when transmitted on the network. Moreover, the second voice information obtained from the second processing on the first voice information occupies less storage space and is more suitable for being transmitted under a limited bandwidth condition. For example, in the navigation mode, the smart wearable device may need to photograph and transmit image information of roads and traffic signs to the host or the cloud in real time so that the image information can be processed. The encoding and compression can greatly reduce the amount of data required for transmission, thereby reducing the bandwidth requirement and improving the transmission efficiency. In a voice interaction scenario, such as voice navigation and voice control, encoding the voice information can ensure real-time and accurate data transmission.

In S140, the data processing result information is executed.

In this embodiment, after receiving the data processing result information, the smart wearable device may perform a corresponding operation based on the data processing result information or present the data processing result information to the user. For example, in the navigation mode, the smart wearable device may display a route image or play a voice navigation instruction; in the cycling motion mode, the smart wearable device may display road condition information, record cycling data, or broadcast a related statistical result; and in the translation mode, the smart wearable device may present translated text or play a voice translation result.

Optionally, executing the data processing result information includes: in response to the data processing result information including the target image information and/or the target text information, displaying the target image information and/or the target text information; in response to the data processing result information including the target audio information, playing the target audio information; or in response to the data processing result information including the target instruction information, executing the target instruction information.

Illustratively, if the data processing result information includes the target image information (such as a navigation route or a recognized text picture) and/or the target text information (such as a translation result or searched product information), the smart wearable device decodes the target image information and/or the target text information and displays the decoded target image information and/or target text information on the screen to provide an intuitive visual experience for the user. If the data processing result information includes the target audio information (such as voice navigation information or commodity introduction audio), the smart wearable device decodes the target audio information and plays the decoded target audio information through a built-in speaker, satisfying the needs of the user in different scenarios (for example, making the user focus more on road conditions and improving the riding safety) and enhancing the user experience. If the data processing result information includes the target instruction information (such as a control signal or an operation instruction), the smart wearable device executes the target instruction information.

In this embodiment, displaying an image and/or text, playing an audio, or executing an instruction according to the type of the data processing result information can bring intuitive, efficient, and secure experience to the user and can improve automation and flexibility of the smart wearable device.

Optionally, displaying the target image information and/or the target text information includes: generating virtual image information and/or virtual text information corresponding to the target image information and/or the target text information through a screen in the smart wearable device; and presenting the virtual image information and/or the virtual text information in a pupil of the target object through an optical assembly.

Figure 5:
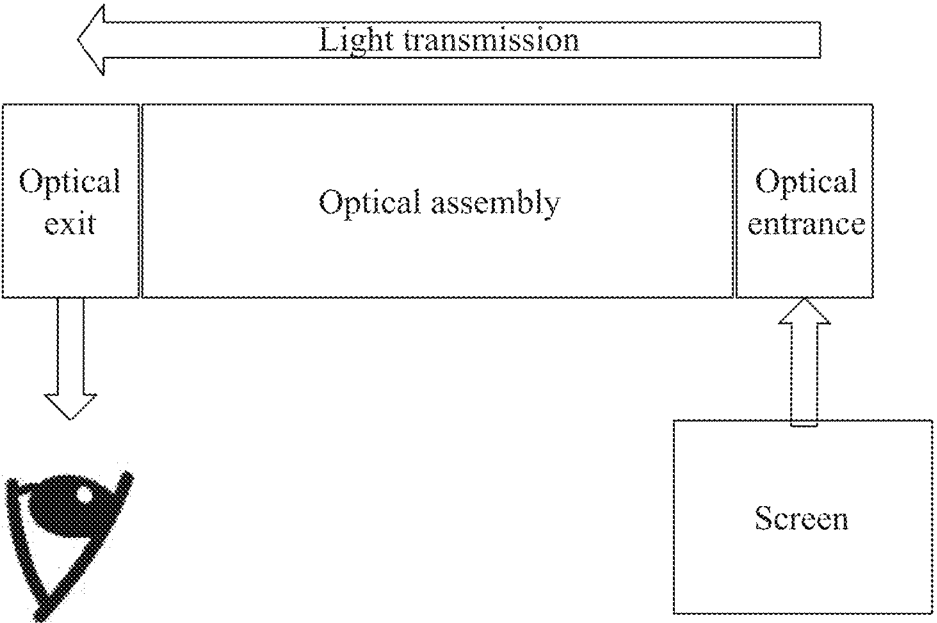
FIG. 5 is a diagram of a display processing process according to an embodiment of this disclosure.

The optical assembly may be a core component configured to implement an augmented reality function in the smart wearable device. That is, an optical assembly is used for optical imaging of the smart wearable device. The optical assembly may include optical elements such as an eyepiece, a lens, a reflector, and a projector. The optical assembly uses various materials, including, but not limited to, optical resin and glass. Based on adjustment of the shape, curvature, and material of the optical assembly, the optical assembly can refract, reflect, or diffract the light inputted at one end (the screen inside the smart wearable device) and clearly transmit the light to the other end, that is, the pupil of the target object. FIG. 5 is a diagram of a display processing process according to an embodiment of this disclosure. The screen in the smart wearable device generates virtual image information and/or virtual text information corresponding to the target image information and/or the target text information. The optical assembly transmits the virtual image information and/or the virtual text information from an optical entrance to an optical exit so that the virtual image information and/or the virtual text information is presented in the pupil of the target object.

As the source of light, the screen in the smart wearable device may use multiple display technologies. The screen includes, but is not limited to, a micro organic light-emitting diode (micro OLED) (also referred to as a silicon-based OLED), a micro light-emitting diode (micro LED), a liquid crystal display (LCD), or digital light processing (DLP). The micro OLED has advantages such as high pixel density, light weight, and low power consumption and has significant advantages in terms of high resolution and self-luminous characteristics. Micro OLED has the advantages of high image quality and low energy consumption. In this embodiment, the display technology is preferably micro OLED, having the characteristics of small size and light weight so that the optical assembly is designed to be small enough, the display resolution of the screen is high, the displayed image is fine and clear enough, and in the case of color display, enough brightness and information capacity can be provided.

After emitted from the screen, light undergoes multiple optical path transmissions and conversions within the optical assembly. This process may include light refraction, reflection, and diffraction. The combination of these optical phenomena allows the light to travel along a predetermined path and direction and, ultimately, be emitted from the exit pupil area of the optical assembly.

In the light transmission process, the optical assembly not only ensures the clear transmission of light, but also enlarges the image to provide a wider field of view and a higher definition. To improve the performance and durability of the optical assembly, the optical assembly is coated during the assembly process. The coating layer can reflect and filter the light to optimize the light transmission efficiency and the image quality. Moreover, attaching a protective layer to the outer layer can improve the wear resistance and scratch resistance of the optical assembly, thereby prolonging the service life of the device.

In this embodiment, since the information is directly presented in the pupil of the target object, the user does not need to additionally turn his/her head or move his/her line of sight to view the information, thereby improving the convenience and efficiency of information acquisition.

In this embodiment, the smart wearable device can present the virtual image information and/or the virtual text information generated by the screen to the user in a manner of high definition and large field of view through the optical assembly, bringing more real and immersive experience to the user.

Figure 6:
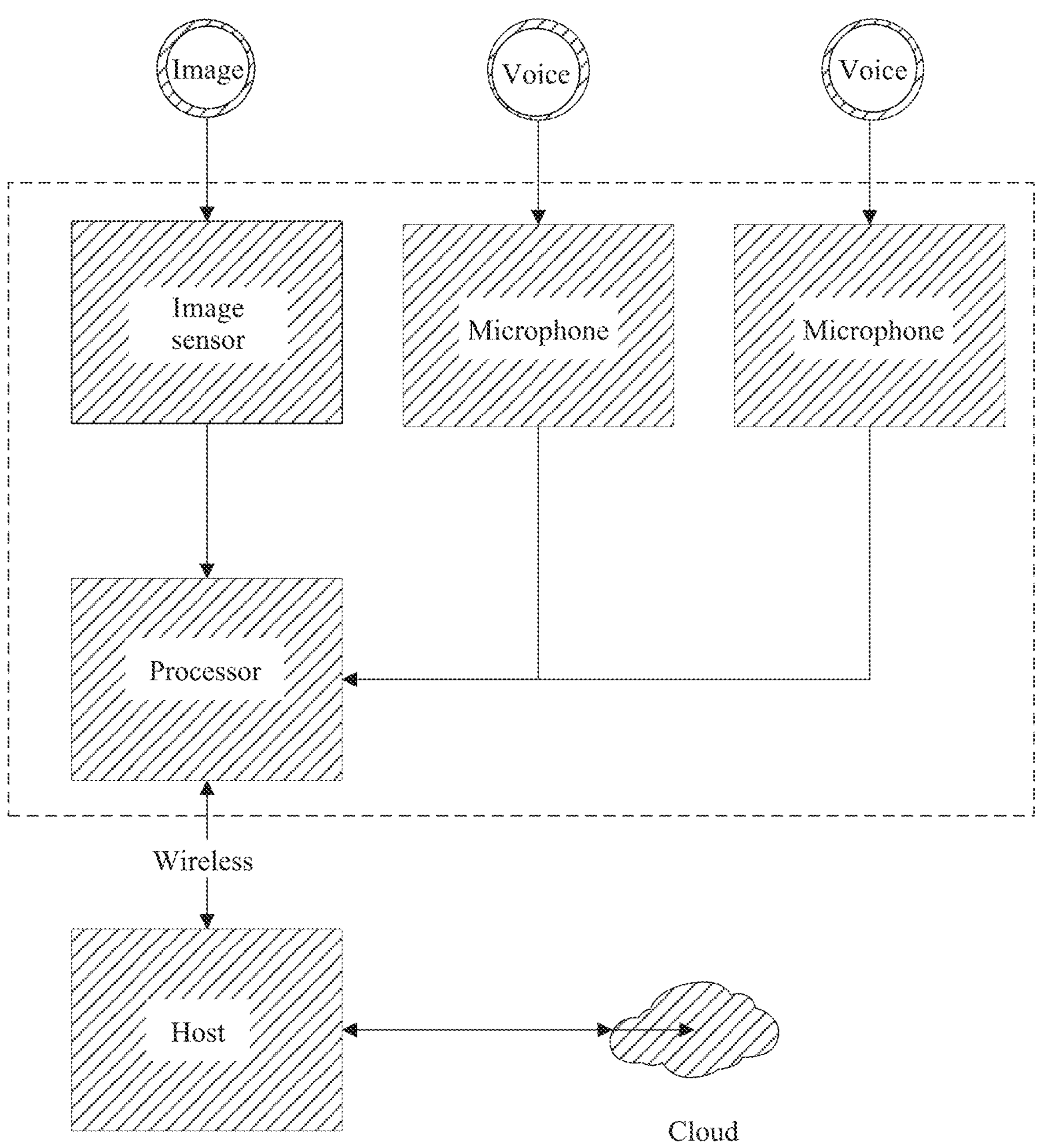
FIG. 6 is a flowchart of data processing according to an embodiment of this disclosure.

FIG. 6 is a flowchart of data processing according to an embodiment of this disclosure. The image sensor in the smart wearable device can acquire an image. The microphone in the smart wearable device can acquire a voice. Multiple microphones are provided (two microphones are shown in FIG. 6). The microphones can be used to acquire the voice (voice content and noise) of the target object. A processor in the smart wearable device processes the acquired image information and voice information. The processing operations may include encoding, compression, and recognition. The processor in the smart wearable device can also perform semantic recognition on the voice information through an offline voice recognition model to control function mode switching of the smart wearable device. The processed image information and voice information are sent to the host wirelessly. The host performs noise cancellation on the processed voice information, performs a data analysis on the voice information acquired by the multiple microphones to improve the gain of the voice information, and filters the noise. The host parses the denoised voice information and the processed image information; or forwards the denoised voice information and the processed image information to the cloud. The cloud parses the received voice information and image information through an artificial intelligence large model and forwards the parsed image information and voice information to the host. The host returns the parsed image information and voice information to the smart wearable device.

In this embodiment, based on the combination of the smart wearable device, the host, and the cloud, user behavior and environment information are acquired from voice and visual aspects so that an intention of the user can be fully understood and multiple functions can be implemented for the user.

In the solution of this embodiment of this disclosure, the data processing method includes fastening the smart wearable device to glasses worn by a target object; determining a target function mode; acquiring first image information captured from the viewpoint of the target object and/or first voice information of the target object based on the target function mode; receiving data processing result information corresponding to the target function mode based on the first image information and/or the first voice information; and executing the data processing result information. In this embodiment of this disclosure, by acquiring, in the target function mode, first image information captured from the viewpoint of the target object and/or first voice information of the target object; receiving data processing result information corresponding to the target function mode based on the first image information and/or the first voice information; and executing the data processing result information, it is possible to improve the data processing accuracy of the smart wearable device and improve the user experience.

It is to be noted that the following embodiments are applied to the host. FIG. 7 is a flowchart of a data processing method according to an embodiment of this disclosure. In this embodiment, the host is not limited. The host may be, for example, a mobile phone, a computer, the storage case of the smart wearable device, or another device with a processing capability.

In S710, in response to receiving first image information and/or first voice information corresponding to the target function mode sent by the smart wearable device, a third processing is performed on the first image information and/or the first voice information to obtain data processing result information corresponding to the target function mode; or the data processing result information corresponding to the target function mode is received based on the first image information and/or the first voice information.

In this embodiment, a third processing may be performed on the first image information and/or the first voice information to obtain data processing result information corresponding to the target function mode; or the first image information and/or the first voice information may be forwarded to the cloud. The cloud performs processing on the first image information and/or the first voice information to obtain the data processing result information corresponding to the target function mode and returns the data processing result information corresponding to the target function mode to the host. The host receives the data processing result information corresponding to the target function mode. The host may return the data processing result information corresponding to the target function mode to the smart wearable device wirelessly.

In this embodiment, a third processing may be performed on the second image information and/or the second voice information to obtain data processing result information corresponding to the target function mode; or the second image information and/or the second voice information may be forwarded to the cloud. The cloud performs processing on the second image information and/or the second voice information to obtain the data processing result information corresponding to the target function mode and returns the data processing result information corresponding to the target function mode to the host. The host receives the data processing result information corresponding to the target function mode. The host may return the data processing result information corresponding to the target function mode to the smart wearable device wirelessly.

In this embodiment, the process in which the host performs the third processing on the first image information and/or the first voice information (the second image information and/or the second voice information) may include performing noise cancellation on the first voice information (the second voice information) and parsing the denoised voice information; and/or parsing the first image information (the second image information).

In this embodiment, image and/or voice information interaction between the smart wearable device and the host enables the acquisition and return of the data processing result corresponding to the target function mode. Based on combination of the advantages of host-side processing and cloud-side processing, flexible, efficient, and secure data processing services are provided for the user.

The data processing result information includes a first data processing result and a second data processing result.

Both the first data processing result and the second data processing result may include at least one of the following: target image information, target text information, target instruction information, or target audio information.

Optionally, performing the third processing on the first image information and/or the first voice information to obtain the data processing result information corresponding to the target function mode includes: performing noise cancellation on the first voice information corresponding to the target function mode to obtain denoised voice information; parsing the denoised voice information to obtain a first data processing result corresponding to the target function mode; parsing the first image information based on the first data processing result or the target function mode to obtain a second data processing result corresponding to the target function mode; and using the first data processing result and/or the second data processing result as the data processing result information corresponding to the target function mode.

In this embodiment, it is feasible to perform noise cancellation on the first voice information corresponding to the target function mode to remove background noise from the first voice information to make clearer the denoised voice information, thereby facilitating subsequent analysis and recognition. The denoised voice information is parsed. The voice is converted into, for example, text, an instruction, or audio, that is, the first data processing result, by using a voice recognition technology. The first image information may be parsed based on the first data processing result or based on the target function mode. The parsing process may include multiple image processing technologies such as image recognition, target detection, scene analysis, and image text translation. The parsing result is the second data processing result.

Illustratively, in the translation mode, the first voice information may include "please translate this menu". After the instruction corresponding to the first voice information is acquired, text recognition is performed on the text in the first image information, and the text is translated into the language specified by the user. It is also feasible to process the translated result into corresponding audio information. It is also feasible to present the translated result in the form of image. That is, in this embodiment, the first data processing result may be the target instruction information, and the second data processing result may include the target text information, the target image information, and the target audio information. The second data processing result may be used as the data processing result information corresponding to the target function mode. Alternatively, in the translation mode, text recognition is performed on the text in the second image information, and the text is translated into the language specified by the user. It is also feasible to process the translated result into corresponding audio information. It is also feasible to present the translated result in the form of image. That is, in this embodiment, the second data processing result may include the target text information, the target image information, and the target audio information. The first voice information may also include "what does XX mean". Accordingly, the first data processing result may be the response information of the first voice information, that is, the first data processing result may be the target text information. Thus, the first data processing result may be used as the data processing result information corresponding to the target function mode.

Illustratively, in the cycling motion mode, the first voice information may be "start recording cycling data". The noise cancellation is performed on first voice information and the denoised first voice information is parsed into the first data processing result, that is, "start recording" target instruction information. Also, in the cycling motion mode, it is feasible to parse the first image information to identify, for example, a landmark or a landscape along the route. That is, the second data processing result may include the target image information. Finally, the first data processing result and the second data processing result may be used as the data processing result information corresponding to the target function mode. That is, the final result may include cycling data and landscape pictures along the route.

In this embodiment, performing noise cancellation on the first voice information corresponding to the target function mode to obtain the denoised voice information and parsing the denoised voice information to obtain the first data processing result corresponding to the target function mode can improve the clarity of the voice information, thereby improving the accuracy of voice recognition. Parsing the first image information based on the first data processing result or the target function mode to obtain the second data processing result corresponding to the target function mode can improve the accuracy and efficiency of image recognition. The diversified first data processing result and second data processing result can satisfy the requirements of different users in different scenarios and provide more personalized and smart services. The first image information is parsed based on the first data processing result, that is, the first image information is processed based on the combination of voice and image, making full use of the complementarity of the two types of information and improving the overall information processing capability and efficiency. The first image information is parsed based on the target function mode, improving the speed of image processing.

In S720, the data processing result information corresponding to the target function mode is returned to the smart wearable device.

In this embodiment, if the data processing result information is the target instruction information, the smart wearable device executes the data processing result information; if the data processing result information includes the target image information and the target text information, the screen displays the data processing result information; and if the data processing result information includes the target audio information, the speaker plays the data processing result information.

Optionally, before returning the data processing result information corresponding to the target function mode to the smart wearable device, the method also includes: in response to the data processing result information including target instruction information corresponding to the host, executing the target instruction information to obtain instruction execution result information; and using the instruction execution result information as the data processing result information corresponding to the target function mode.

Illustratively, in the navigation switching mode, if the data processing result information is "switch to the backup route", that is, the data processing result information is the target instruction information, the host executes the corresponding target instruction information according to the internal map and route data and returns the switched navigation route information as the instruction execution result information to the smart wearable device. The smart wearable device displays the new navigation route and related information through the screen. In this embodiment, navigation switching is implemented on the smart wearable device in a voice manner, enhancing the safety and providing more convenient and secure user experience.

Illustratively, in the meal ordering mode, if the first voice information is "open the meal ordering app", the host executes the target instruction information corresponding to the first voice information and returns the interface after the meal ordering app is opened to the smart wearable device. The smart wearable device displays the meal ordering interface through the screen. In this embodiment, the user can perform online meal ordering on the smart wearable device in a voice manner, thereby providing the user with more convenient meal ordering experience.

In this embodiment, if the data processing result information includes the target instruction information corresponding to the host, the host executes the target instruction information to obtain the instruction execution result information and uses the instruction execution result information as the data processing result information corresponding to the target function mode so that the user can implement functions in various scenarios on the smart wearable device in a voice manner, bringing more convenient, efficient, and secure user experience.

Optionally, the method also includes: in response to the received target function mode sent by the smart wearable device being a navigation function mode, acquiring initial geographic location information corresponding to multiple time instants, where the multiple time instants include the current time instant and a historical time instant; calibrating the initial geographic location information corresponding to the multiple time instants to obtain multiple pieces of target geographic location information; determining first motion information of the target object at the current time instant based on the multiple pieces of target geographic location information; generating target navigation information based on destination location information, target geographic location information corresponding to the current time instant, and the first motion information; and returning the target navigation information as a data processing result corresponding to the navigation function mode to the smart wearable device.

FIG. 8 is a flowchart of data processing according to an embodiment of this disclosure. When the target function mode sent by the smart wearable device and received by the host is the navigation function mode, the host may receive a satellite signal by using the global navigation satellite system (GNSS) to locate the smart wearable device to obtain initial geographic location information corresponding to multiple time instants. The GNSS includes, but is not limited to, Beidou, global positioning system (GPS), or GLObal NAvigation Satellite System (Glonass). The global navigation satellite system can not only acquire geographic location information at the current time instant, but can also acquire geographic location information at the historical time instant. At the same time, it communicates with a server to calibrate the initial geographic location information corresponding to the multiple time instants through the server to obtain multiple pieces of target geographic location information, thereby improving the accuracy of the location information. The first motion information of the target object at the current time is calculated based on the multiple pieces of target geographic location information. The first motion information includes the current speed (calculated based on the multiple pieces of target geographic location information), the current motion direction, and the current target location information (that is, the target geographic location information at the current time instant) of the target object. Finally, based on the combination of the preset destination location information, the target geographic location information corresponding to the current time, and the first motion information, the target navigation information is generated. The target navigation information includes the map, planned route, target geographic location information at the current time, current speed, remaining distance (calculated based on the destination location information and the target geographic location information at the current time), remaining time (calculated based on the remaining distance and the current speed), and other related information. After generated, the target navigation information is compressed and returned in the form of image, text, or audio to the smart wearable device wirelessly. The smart wearable device displays the target navigation information on its screen and can also play the information through its speaker.

In this embodiment, the geographic location information of the user can be acquired in real time by using the global navigation satellite system, thereby ensuring accurate and real-time navigation information. By calibrating the geographic location information through the server and conducting motion analysis based on location information at multiple time instants, it is possible to improve the accuracy of the navigation information. The target navigation information is displayed on the smart wearable device in various forms such as image, text, and audio, allowing the user to access navigation information without the need to hold the host, greatly enhancing convenience. Based on the motion information and destination information of the user, personalized navigation routes and guidance can be generated, satisfying the needs of different users.

Optionally, the method also includes: in response to the received target function mode sent by the smart wearable device being a cycling motion mode, receiving second motion information sent by a motion sensor; parsing the second motion information; and returning the parsed second motion information as a data processing result corresponding to the cycling motion mode to the smart wearable device.

As shown in FIG. 8, in this embodiment, when the target function mode sent by the smart wearable device and received by the host is the cycling motion mode, the host receives the second motion information sent by the motion sensor. The motion sensor includes, but is not limited to, a peripheral device such as a cadence sensor, a heart rate sensor, a power meter, or a cycling light (FIG. 8 shows only the cadence sensor and the heart rate sensor). The motion sensor is wirelessly connected to the host. The second motion information may include cadence, heart rate, and power. After receiving the second motion information, the host parses the second motion information to convert the second motion information into a format suitable for subsequent processing or display. The host uses the parsed second motion information (such as cadence, heart rate, and power) as the data processing result corresponding to the cycling motion mode and then returns the parsed second motion information to the smart wearable device wirelessly. The smart wearable device displays the data processing result corresponding to the cycling motion mode through the screen and can also play corresponding audio information, better improving the experience effect.

In this embodiment, the host receives the second motion information sent by the motion sensor; parses the second motion information; and returns the parsed second motion information as the data processing result corresponding to the cycling motion mode to the smart wearable device. That is, based on the combination of the host and the smart wearable device, the user can know his/her own motion state in real time in the cycling motion mode without looking down at devices such as the odometer and the host, thereby improving the safety and convenience of cycling and bringing more smart and convenient cycling experience to the user.

In the solution of this embodiment of this disclosure, the data processing method includes: in response to receiving first image information and/or first voice information corresponding to the target function mode sent by the smart wearable device, performing the third processing on the first image information and/or the first voice information to obtain data processing result information corresponding to the target function mode; or receiving the data processing result information corresponding to the target function mode based on the first image information and/or the first voice information; and returning the data processing result information corresponding to the target function mode to the smart wearable device. In this embodiment of this disclosure, the host performs the third processing on the first image information and/or the first voice information to obtain data processing result information corresponding to the target function mode; or receives the data processing result information corresponding to the target function mode based on the first image information and/or the first voice information; and returns the data processing result information corresponding to the target function mode to the smart wearable device; thus, it is possible to improve the data processing accuracy of the smart wearable device and improve the user experience.

Figure 9:
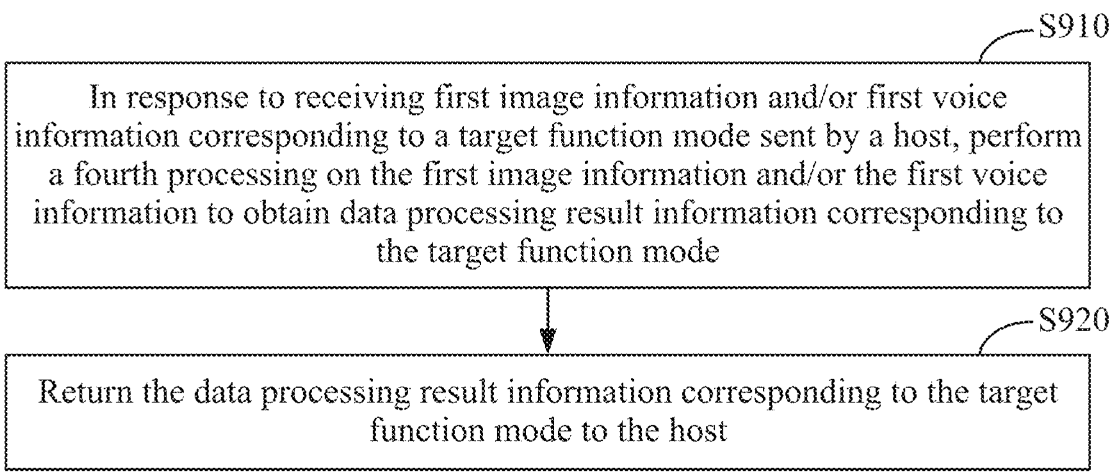
FIG. 9 is a flowchart of a data processing method according to an embodiment of this disclosure.

It is to be noted that the following embodiments are applicable to the cloud. FIG. 9 is a flowchart of a data processing method according to an embodiment of this disclosure.

In S910, in response to receiving first image information and/or first voice information corresponding to a target function mode sent by a host, a fourth processing is performed on the first image information and/or the first voice information to obtain data processing result information corresponding to the target function mode.

In this embodiment, it is feasible to perform the fourth processing on the first image information and/or the first voice information to obtain the data processing result information corresponding to the target function mode; it is also feasible to perform the fourth processing based on the second image information and/or the second voice information to obtain the data processing result information corresponding to the target function mode. The first voice information (the second voice information) is the voice information denoised by the host. The process in which the cloud processes the first image information and/or the first voice information (the second image information and/or the second voice information) may include parsing the first voice information (the second voice information) (the parsing process may include preprocessing and performing voice recognition on the preprocessed voice information) and parsing the first image information (the second image information) (the parsing process may include preprocessing, feature extraction, and image recognition).

In S920, the data processing result information corresponding to the target function mode is returned to the host.

In this embodiment, the cloud may return the data processing result information corresponding to the target function mode to the host. The host returns the data processing result information corresponding to the target function mode to the smart wearable device.

In this embodiment, the cloud performs the fourth processing on the first image information and/or the first voice information to obtain the data processing result information corresponding to the target function mode and returns the data processing result information corresponding to the target function mode to the host, thus fully utilizing the powerful computing capability and storage resources of the cloud and processing complex voice information and image information, thereby improving the data processing accuracy of the smart wearable device and improving the user experience. Additionally, the close cooperation between the smart wearable device, the host, and the cloud can bring more intelligent, efficient, and convenient user experience.

Figure 10:
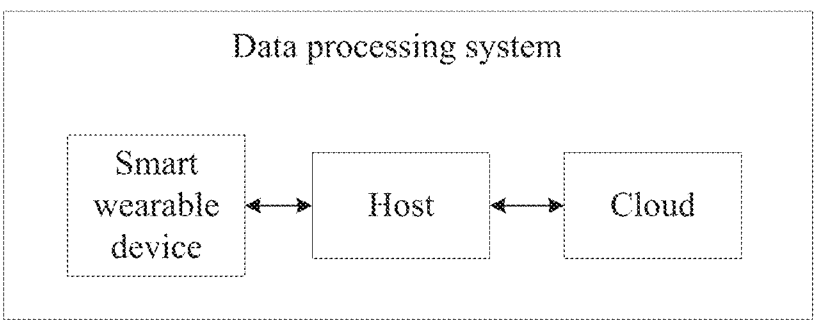
FIG. 10 is a diagram illustrating the structure of a data processing system according to an embodiment of this disclosure.

FIG. 10 is a diagram illustrating the structure of a data processing system according to an embodiment of this disclosure. The system includes the smart wearable device, a host, and a cloud. The smart wearable device is configured to be fastened to the glasses worn by the target object. The smart wearable device is configured to acquire the first image information captured from the viewpoint of the target object and/or the first voice information of the target object based on the target function mode and send the first image information and/or the first voice information to the host. The host is configured to perform a third processing on the first image information and/or the first voice information to obtain the data processing result information corresponding to the target function mode and return the data processing result information to the smart wearable device; or forward the first image information and/or the first voice information to the cloud. The cloud is configured to perform a fourth processing on the first image information and/or the first voice information to obtain the data processing result information corresponding to the target function mode; and return the data processing result information to the host. The host is also configured to forward, to the smart wearable device, the data processing result information returned by the cloud. The smart wearable device is also configured to execute the data processing result information.

In this embodiment, for the smart wearable device, after the target function mode is triggered, the first image information captured from the viewpoint of the target object may be acquired by an image sensor built in the smart wearable device, and the first voice information of the target object may be acquired by a microphone built in the smart wearable device. The first image information and/or the first voice information may be sent to the host. The host performs a third processing on the first image information and/or the first voice information to obtain the data processing result information corresponding to the target function mode and returns the data processing result information to the smart wearable device; or forwards the first image information and/or the first voice information to the cloud. The cloud performs a fourth processing on the first image information and/or the first voice information to obtain the data processing result information corresponding to the target function mode and returns the data processing result information to the host. The host forwards the data processing result information returned by the cloud to the smart wearable device. After the smart wearable device receives the data processing result information, if the data processing result information includes the target image information and/or the target text information, the smart wearable device displays the target image information and/or the target text information; if the data processing result information includes the target audio information, the smart wearable device plays the target audio information; and if the data processing result information includes the target instruction information, the smart wearable device executes the target instruction information.

In this embodiment, since the smart wearable device is directly associated with the target object, it is possible to acquire, in real time, the image and voice information captured from the viewpoint of the target object and process the image and voice information by using the host and the cloud, thereby obtaining a timely and accurate data processing result and improving the user experience. Since the smart wearable device is fastened to glasses worn by the target object, the design of the smart wearable device enables the smart wearable device to be conveniently worn on the target object, thereby providing data acquisition and interaction capabilities anytime and anywhere. The host and the cloud form a powerful capability of processing various complex image and voice information and thus can satisfy different application requirements. The system of this embodiment supports transferring some or all of the data processing tasks to the cloud for processing to balance computing resources between the smart wearable device, the host, and the cloud. The system of this embodiment can bring various significant effects such as enhanced user experience, improved data processing capability, flexibility, and real-time performance, improved safety, reduced burden on the smart wearable device, and multi-scene applicability.

Figure 11:
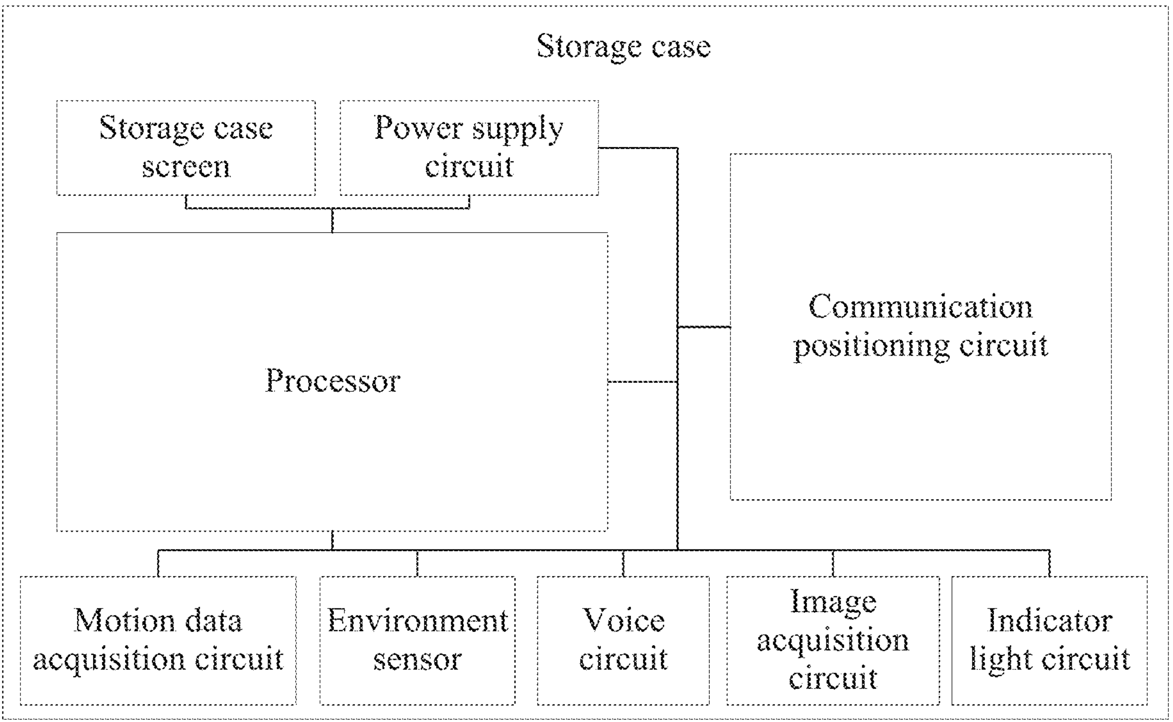
FIG. 11 is a diagram illustrating the structure of a storage case according to an embodiment of this disclosure.

Illustratively, FIG. 11 is a diagram illustrating the structure of a storage case according to an embodiment of this disclosure. Optionally, the host includes a storage case. The storage case includes a power supply circuit, a storage case screen, a processor, a communication positioning circuit, a motion data acquisition circuit, an environment sensor, a voice circuit, an image acquisition circuit, and an indicator light circuit. The power supply circuit is configured to charge the smart wearable device and supply power to the storage case. The storage case screen is configured to display operating mode information of the storage case and forward the operating mode information to the smart wearable device through the communication positioning circuit. The processor is configured to process information sent by the smart wearable device and a motion sensor and send the processed information to the smart wearable device through the communication positioning circuit; or forward, to the cloud, the information sent by the smart wearable device. The communication positioning circuit is configured to communicate with the smart wearable device and the cloud and is configured to acquire initial geographic location information, determine motion information based on the initial geographic location information, and transmit the motion information to the smart wearable device. The motion data acquisition circuit is configured to acquire original motion information to determine target motion information based on the original motion information and transmit the target motion information to the smart wearable device through the communication positioning circuit. The environment sensor is configured to detect the light intensity of the surrounding environment of the smart wearable device to adjust the brightness of the smart wearable device according to the light intensity. The voice circuit is configured to acquire voice information and control the function mode of the smart wearable device through the voice information. The image acquisition circuit is configured to acquire image information to replace image information acquired by the smart wearable device. The indicator light circuit is configured to display the working state of the storage case.

Figure 12:
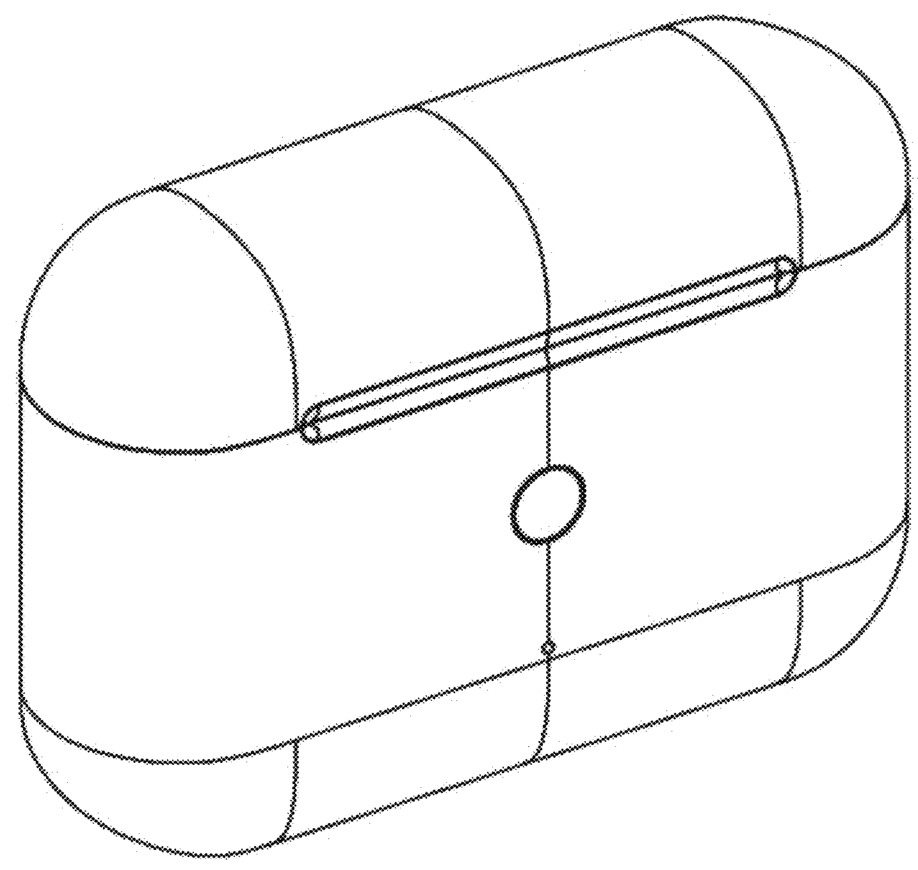
FIG. 12 is a diagram illustrating the effect of a storage case according to an embodiment of this disclosure.

In this embodiment, the storage case may be configured to charge the smart wearable device or may serve as an independent host that has identification, processing, and independent Internet access capabilities. The storage case may be considered as hardware that works independently of a mobile phone. Illustratively, FIG. 12 is a diagram illustrating the effect of a storage case according to an embodiment of this disclosure.

Specifically, after the smart wearable device is placed in the storage case, the power supply circuit in the storage case may charge the smart wearable device or may supply power to the storage case to enable the operation of components such as the screen, the processor, and the communication positioning circuit of the storage case. The power supply circuit may be understood as a battery. The type of the battery is not limited in this embodiment. For example, the battery may be a lithium battery, a nickel metal hydride battery, an alkaline battery, or a solar battery.

In this embodiment, the storage case screen can display the operating mode information of the storage case and forward the operating mode information to the smart wearable device through the communication positioning circuit. After receiving the operating mode information, the smart wearable device can switch to the corresponding target function mode according to the operating mode information. The storage case screen can also switch operating modes in a manner such as touch or voice. In this embodiment, the display technology used by the storage case screen is not limited. For example, the storage case screen may be an OLED touch screen, a liquid crystal screen, a capacitive touch screen, or an infrared touch screen.

In this embodiment, the processor (CPU) built in the storage case can process external information of the motion sensor (or another type of sensor) and information sent by the smart wearable device and send the processed information to the communication positioning circuit. The communication positioning circuit sends the processed information to the smart wearable device. The information sent by the smart wearable device can also be forwarded to the cloud. The processor built in the storage case can also control the operating mode of the motion sensor, for example, enable the operating mode or disable the operating mode. The received data is stored in an embedded multi-media card (eMMC) and a double data rate synchronous dynamic random access memory (DDR). The processor built in the storage case can also have an independent power management module. The power management module can supply power to the processor, the motion sensor, and other types of sensors.

In this embodiment, the communication technology used by the communication positioning circuit may include Wireless Fidelity (Wi-Fi), Bluetooth, long-term evolution (LTE) (for example, the 4th-generation wireless mobile communication technology standard), or GPS. The storage case can communicate with the smart wearable device and the cloud through the communication positioning circuit. The communication positioning circuit can also acquire initial geographic location information corresponding to multiple time instants so that the communication positioning circuit can calibrate the initial geographic location information corresponding to the multiple time instants to obtain multiple pieces of target geographic location information and then the communication positioning circuit can determine the first motion information of the target object at the current time instant based on the multiple pieces of target geographic location information. The communication positioning circuit can also transmit the first motion information to the smart wearable device.

In this embodiment, not only the motion sensor can acquire the motion data, the host can also acquire the motion data. Specifically, the motion data acquisition circuit can acquire the original motion information, the processor can process the original motion information to obtain the target motion information, and the communication positioning circuit can transmit the target motion information to the smart wearable device. Illustratively, the motion data acquisition circuit may include a gyroscope, an accelerometer, and a geomagnetic sensor. The gyroscope can acquire original motion information including angular velocity data. The accelerometer can acquire original motion information including acceleration. The geomagnetic sensor can acquire original motion information including magnetic field strength and direction data. The acceleration acquired by the accelerometer may be denoised and interfered. The denoised and interference-free acceleration may be used as the target motion information. The rotation angle and direction of the storage case may be obtained through calculation of the angular velocity data. The rotation angle and direction of the user may be obtained based on the rotation angle and direction of the storage case and may be used as the target motion information. Based on the combination of the data acquired by the geomagnetic sensor and the accelerometer, the absolute orientation of the storage case can be determined so that the absolute orientation of the user can be calculated. The geographical location information corresponding to the multiple time instants acquired by the GPS may also be used as the original motion information. The average speed calculated based on the geographical location information corresponding to the multiple time instants may be used as the target motion information.

In this embodiment, the storage case also includes an environment sensor. The environment sensor can detect the light intensity of the surrounding environment of the smart wearable device, that is, the light intensity, and can determine whether the current environment is bright or dim according to the light intensity so that the brightness of the screen in the smart wearable device can be adjusted according to the acquired light intensity. For example, if it is determined through the light intensity that the current environment is sufficiently light (bright), the brightness adjustment instruction corresponding to the light intensity is sent to the smart wearable device, and the smart wearable device executes the brightness adjustment instruction, thereby increasing the brightness of the screen in the smart wearable device to ensure that the content is clearly visible; and if it is determined through the light intensity that the current environment is dim, the brightness adjustment instruction corresponding to the light intensity is sent to the smart wearable device, and the smart wearable device executes the brightness adjustment instruction, thereby reducing the brightness of the screen in the smart wearable device to reduce the stimulation to eyes and save the electric energy.

In this embodiment, the storage case also includes a voice circuit. The voice circuit acquires voice information of the target object through multiple microphones and controls the function mode of the smart wearable device through the voice information. The voice circuit can also play corresponding audio information such as a fault prompt tone and music by using a speaker. The storage case also includes an image acquisition circuit. The image acquisition circuit can use a high-definition camera to acquire the image information and the depth information captured from the viewpoint of the target object. Since the image acquisition capability of the storage case is stronger than that of the smart wearable device, the image information acquired by the image acquisition circuit can replace the image information acquired by the smart wearable device. The storage case also includes an indicator light circuit. The indicator light circuit displays the working state of the storage case by using a color light-emitting diode (LED) indicator light. The working state may include the charging state, the communication state, the image and voice acquisition state, and other states of the smart wearable device. For example, when the smart wearable device is placed in the storage case so as to be charged, the indicator light circuit may continuously light or flash through a particular LED (such as a blue LED) to indicate that the smart wearable device is being charged. When the smart wearable device is fully charged, the LED light (such as a blue LED) of the indicator light circuit stops flashing or changes to an LED light of another color (such as a green LED) to indicate that the charging is completed.

Figure 13:
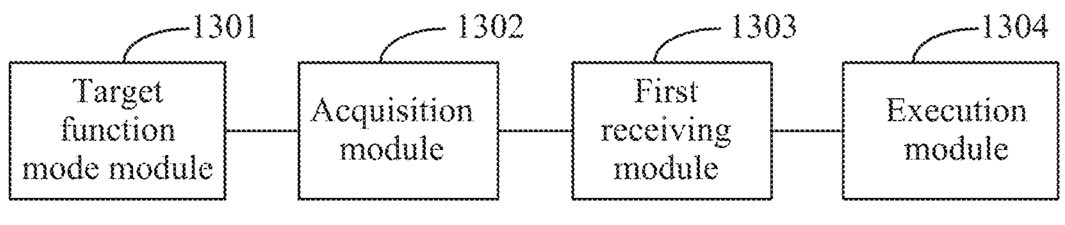
FIG. 13 is a diagram illustrating the structure of a data processing apparatus according to an embodiment of this disclosure.

FIG. 13 is a diagram illustrating the structure of a data processing apparatus according to an embodiment of this disclosure. The apparatus is applied to a smart wearable device. As shown in FIG. 13, the apparatus includes a target function mode module 1301, an acquisition module 1302, a first receiving module 1303, and an execution module 1304.

The target function mode module 1301 is configured to determine a target function mode.

The acquisition module 1302 is configured to acquire first image information captured from the viewpoint of the target object and/or first voice information of the target object based on the target function mode.

The first receiving module 1303 is configured to receive data processing result information corresponding to the target function mode based on the first image information and/or the first voice information.

The execution module 1304 is configured to execute the data processing result information.

In the solution of this embodiment of this disclosure, the smart wearable device is fastened to glasses worn by a target object; the target function mode module determines a target function mode; the acquisition module acquires first image information captured from the viewpoint of the target object and/or first voice information of the target object based on the target function mode; the first receiving module receives data processing result information corresponding to the target function mode based on the first image information and/or the first voice information; and the execution module executes the data processing result information. By acquiring, in the target function mode, first image information captured from the viewpoint of the target object and/or first voice information of the target object; receiving data processing result information corresponding to the target function mode based on the first image information and/or the first voice information; and executing the data processing result information, it is possible to improve the data processing accuracy of the smart wearable device and improve the user experience.

Optionally, the target function mode module is configured to determine a target function mode in at least one of the following manners: smart wearable device touch control information, smart wearable device voice control information, or host operation control information. The smart wearable device touch control information includes control information sent by touching a touch area set in the smart wearable device. The host operation control information includes at least one of the following: host touch control information, host button control information, or host voice control information.

Optionally, the first receiving module is configured to perform a first processing on the first image information to obtain second image information; perform a second processing on the first voice information to obtain second voice information; and receive the data processing result information corresponding to the target function mode based on the second image information and/or the second voice information.

The data processing result information includes at least one of the following: target image information, target text information, target instruction information, or target audio information.

Optionally, the execution module is configured to, in response to the data processing result information including the target image information and/or the target text information, display the target image information and/or the target text information; in response to the data processing result information including the target audio information, play the target audio information; or in response to the data processing result information including the target instruction information, execute the target instruction information.

Optionally, the execution module is also configured to generate virtual image information and/or virtual text information corresponding to the target image information and/or the target text information through a screen in the smart wearable device; and present the virtual image information and/or the virtual text information in a pupil of the target object through an optical assembly.

Figure 14:
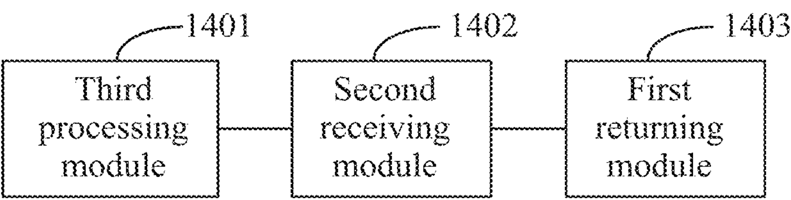
FIG. 14 is a diagram illustrating the structure of a data processing apparatus according to an embodiment of this disclosure.

FIG. 14 is a diagram illustrating the structure of a data processing apparatus according to an embodiment of this disclosure. The apparatus is applied to a host. As shown in FIG. 14, the apparatus includes a third processing module 1401, a second receiving module 1402, and a first returning module 1403.

The third processing module 1401 is configured to, in response to receiving first image information and/or first voice information corresponding to the target function mode sent by a smart wearable device, perform a third processing on the first image information and/or the first voice information to obtain data processing result information corresponding to the target function mode.

The second receiving module 1402 is configured to receive the data processing result information corresponding to the target function mode based on the first image information and/or the first voice information.

The first returning module 1403 is configured to return the data processing result information corresponding to the target function mode to the smart wearable device.

In the solution of this embodiment of this disclosure, the third processing module, in response to receiving first image information and/or first voice information corresponding to the target function mode sent by a smart wearable device, performs a third processing on the first image information and/or the first voice information to obtain data processing result information corresponding to the target function mode; the second receiving module receives the data processing result information corresponding to the target function mode based on the first image information and/or the first voice information; and the first returning module returns the data processing result information corresponding to the target function mode to the smart wearable device. The host performs a third processing on the first image information and/or the first voice information to obtain data processing result information corresponding to the target function mode; receives the data processing result information corresponding to the target function mode based on the first image information and/or the first voice information; and returns the data processing result information corresponding to the target function mode to the smart wearable device; thus, it is possible to improve the data processing accuracy of the smart wearable device and improve the user experience.

The data processing result information includes a first data processing result and a second data processing result.

Optionally, the third processing module is configured to denoise the first voice information corresponding to the target function mode to obtain denoised voice information; parse the denoised voice information to obtain a first data processing result corresponding to the target function mode; parse the first image information based on the first data processing result or the target function mode to obtain a second data processing result corresponding to the target function mode; and use the first data processing result and/or the second data processing result as the data processing result information corresponding to the target function mode.

Optionally, the apparatus also includes an instruction execution module. The instruction execution module is configured to, in response to the data processing result information including target instruction information corresponding to the host, execute the target instruction information to obtain instruction execution result information; and use the instruction execution result information as the data processing result information corresponding to the target function mode.

Optionally, the apparatus also includes communication positioning circuit. The communication positioning circuit is configured to, in response to the received target function mode sent by the smart wearable device being a navigation function mode, acquire initial geographic location information corresponding to multiple time instants, where the multiple time instants include a current time instant and a historical time instant; calibrate the initial geographic location information corresponding to the multiple time instants to obtain multiple pieces of target geographic location information; determine first motion information of the target object at the current time instant based on the multiple pieces of target geographic location information; generate target navigation information based on destination location information, target geographic location information corresponding to the current time instant, and the first motion information; and return the target navigation information as a data processing result corresponding to the navigation function mode to the smart wearable device.

Optionally, the apparatus also includes a parsing module. The parsing module is configured to, in response to the received target function mode sent by the smart wearable device being a cycling motion mode, receive second motion information sent by a motion sensor; parse the second motion information; and return the parsed second motion information as a data processing result corresponding to the cycling motion mode to the smart wearable device.

Figure 15:
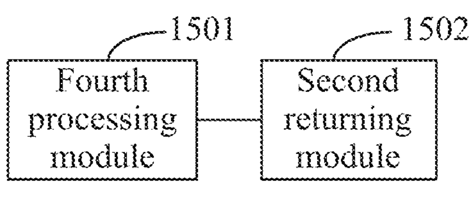
FIG. 15 is a diagram illustrating the structure of a data processing apparatus according to an embodiment of this disclosure.

FIG. 15 is a diagram illustrating the structure of a data processing apparatus according to an embodiment of this disclosure. The apparatus is applied to a cloud. As shown in FIG. 15, the apparatus includes a fourth processing module 1501 and a second returning module 1502.

The fourth processing module 1501 is configured to, in response to receiving first image information and/or first voice information corresponding to the target function mode sent by a host, perform a fourth processing on the first image information and/or the first voice information to obtain data processing result information corresponding to the target function mode, where the first voice information is voice information denoised by the host.

The second returning module 1502 is configured to return the data processing result information corresponding to the target function mode to the host.

In the solution of this embodiment of this disclosure, the fourth processing module, in response to receiving first image information and/or first voice information corresponding to the target function mode sent by a host, performs a fourth processing on the first image information and/or the first voice information to obtain data processing result information corresponding to the target function mode, where the first voice information is voice information denoised by the host; and the second returning module returns the data processing result information corresponding to the target function mode to the host. Complex voice information and image information can be processed by using the powerful computing capability and storage resources of the cloud; thus, it is possible to improve the data processing accuracy of the smart wearable device and improve the user experience.

The data processing apparatus of this embodiment of this disclosure can perform the data processing method of any embodiment of this disclosure and has function modules for and beneficial effects of the method performed.

Figure 16:
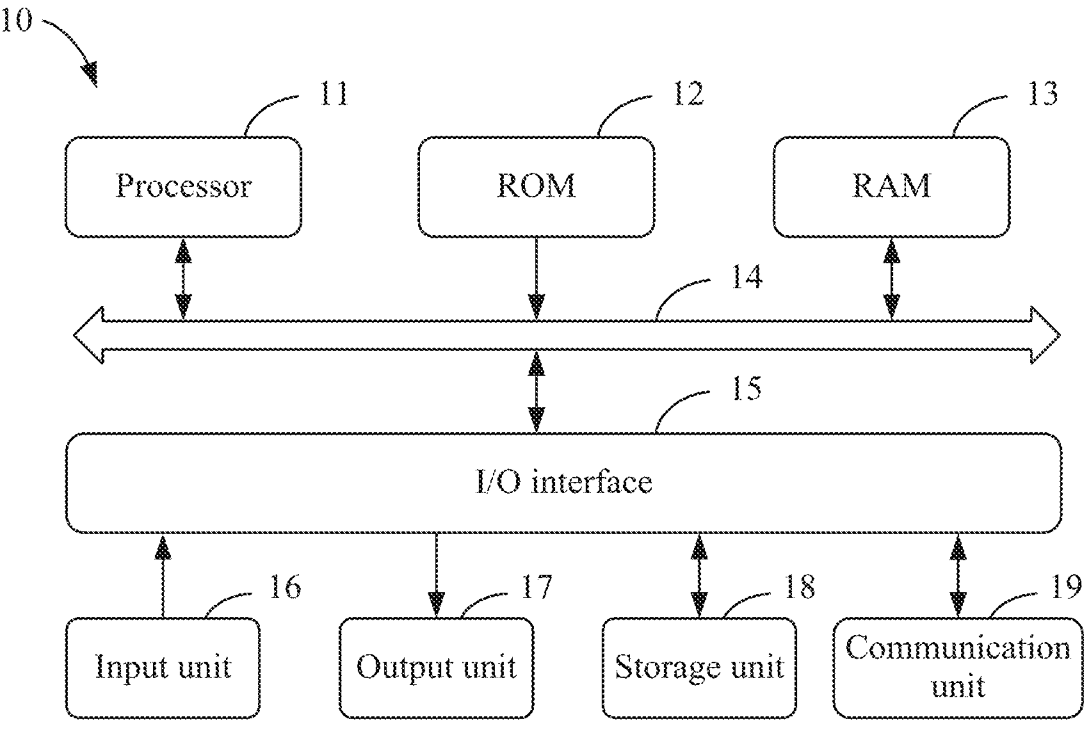
FIG. 16 is a diagram illustrating the structure of an electronic device according to an embodiment of this disclosure.

FIG. 16 is a diagram illustrating the structure of an electronic device 10 for implementing any embodiment of this invention. The electronic device is intended to represent various forms of digital computers, for example, a laptop computer, a desktop computer, a worktable, a personal digital assistant, a server, a blade server, a mainframe computer, and an applicable computer. The electronic device may also represent various forms of mobile apparatuses, for example, a personal digital assistant, a cellphone, a smartphone, a wearable device (such as a helmet, glasses, or a watch), and a similar computing apparatus. Herein the shown components, the connections and relationships between these components, and the functions of these components are illustrative only and are not intended to limit the implementation of this disclosure as described and/or claimed herein.

As shown in FIG. 16, the electronic device 10 includes at least one processor 11 and a memory, such as a read-only memory (ROM) 12 or a random-access memory (RAM) 13, communicatively connected to the at least one processor 11. The memory stores a computer program executable by the at least one processor. The at least one processor 11 may perform various types of appropriate operations and processing according to a computer program stored in a read-only memory (ROM) 12 or a computer program loaded from a storage unit 18 to a random-access memory (RAM) 13.

Various programs and data required for the operation of the electronic device 10 may also be stored in the RAM 13. The processor 11, the ROM 12, and the RAM 13 are connected to each other through a bus 14. An I/O interface 15 is also connected to the bus 14.

Multiple components in the electronic device 10 are connected to the I/O interface 15. The multiple components include an input unit 16 such as a keyboard or a mouse, an output unit 17 such as various types of display or speaker, the storage unit 18 such as a magnetic disk or an optical disk, and a communication unit 19 such as a network card, a modem, or a wireless communication transceiver. The communication unit 19 allows the electronic device 10 to exchange information/data with other devices over a computer network such as the Internet and/or various telecommunication networks.

The processor 11 may be various general-purpose and/or special-purpose processing components having processing and computing capabilities. Examples of the processor 11 include, but are not limited to, a central processing unit (CPU), a graphics processing unit (GPU), a special-purpose AI computing chip, a processor executing machine learning models and algorithms, a digital signal processor (DSP), and any appropriate processor, controller, and microcontroller. The processor 11 performs the preceding various methods and processing, such as the data processing method.

In some embodiments, the data processing method may be implemented as computer programs tangibly contained in a computer-readable storage medium such as the storage unit 18. In some embodiments, part or all of computer programs may be loaded and/or installed onto the electronic device 10 via the ROM 12 and/or the communication unit 19. When the computer programs are loaded to the RAM 13 and executed by the processor 11, one or more steps of the preceding data processing method may be performed. Alternatively, in other embodiments, the processor 11 may be configured, in any other suitable manner (for example, by means of firmware), to perform the data processing method.

Herein various embodiments of the preceding systems and techniques may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), computer hardware, firmware, software, and/or combinations thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input apparatus, and at least one output apparatus and transmitting data and instructions to the memory system, the at least one input apparatus, and the at least one output apparatus.

Computer programs for implementation of the methods of this disclosure may be written in one programming language or any combination of multiple programming languages. The computer programs may be provided for a processor of a general-purpose computer, a special-purpose computer, or another programmable data processing apparatus to enable functions/operations specified in a flowchart and/or a block diagram to be implemented when the computer programs are executed by the processor. The computer programs may be executed entirely on a machine, partly on a machine, as a stand-alone software package, partly on a machine and partly on a remote machine, or entirely on a remote machine or a server.

In the context of this disclosure, the computer-readable storage medium may be a tangible medium including or storing a computer program that is used by or used in conjunction with an instruction execution system, apparatus or device. The computer-readable storage medium may include, but is not limited to, an electronic, magnetic, optical, electromagnetic, infrared, or semiconductor system, apparatus, or device or any appropriate combination thereof. Alternatively, the computer-readable storage medium may be a machine-readable signal medium. Examples of a machine-readable storage medium include an electrical connection based on one or more wires, a portable computer disk, a hard disk, a RAM, a ROM, an erasable programmable read-only memory (EPROM), a flash memory, an optical fiber, a portable compact disc read-only memory (CD-ROM), an optical storage device, a magnetic storage device, or any appropriate combination thereof.

In order that interaction with a user is provided, the systems and techniques described herein may be implemented on the electronic device. The electronic device has a display device (for example, a cathode-ray tube (CRT) or a liquid-crystal display (LCD) monitor) for displaying information to the user; and a keyboard and a pointing device (for example, a mouse or a trackball) through which the user can provide input for the electronic device. Other types of apparatuses may also be used for providing interaction with a user. For example, feedback provided for the user may be sensory feedback in any form (for example, visual feedback, auditory feedback, or tactile feedback); and input from the user may be received in any form (including acoustic input, voice input, or tactile input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with embodiments of the systems and techniques described herein), or a computing system including any combination of such back-end, middleware, or front-end components. Components of a system may be interconnected by any form or medium of digital data communication (for example, a communication network). Examples of the communication network include a local area network (LAN), a wide area network (WAN), a blockchain network, and the Internet.

The computing system may include clients and servers. A client and a server are generally remote from each other and typically interact through a communication network. The relationship between the client and the server arises by virtue of computer programs running on respective computers and having a client-server relationship to each other. The server may be a cloud server, also referred to as a cloud computing server or a cloud host. As a host product in a cloud computing service system, the server solves the defects of difficult management and weak service scalability in a related physical host and a related virtual private server (VPS).

An embodiment of this application provides a computer program product. The computer program product includes a computer program which, when executed by a processor, causes the processor to perform the data processing method of any embodiment of this disclosure.

During implementation of the computer program product, computer program codes for performing the operations of this disclosure may be written in one or more programming languages or a combination thereof. The programming languages include object-oriented programming languages such as Java, Smalltalk and C++ and also include conventional procedural programming languages such as "C" and similar programming languages. Program codes may be executed entirely on a user computer, executed partly on a user computer, executed as a stand-alone software package, executed partly on a user computer and partly on a remote computer or executed entirely on a remote computer or a server. In the case where the remote computer is involved, the remote computer may be connected to the user computer via any type of network including a LAN or a WAN, or may be connected to an external computer (for example, via the Internet provided by an Internet service provider).

It is to be noted that preferred embodiments of this disclosure and technical principles used therein are described above. It is appreciated by those skilled in the art that this disclosure is not limited to the embodiments described herein. Those skilled in the art can make various apparent modifications, adaptations, and substitutions without departing from the scope of this disclosure. Therefore, although this disclosure has been described in detail through the preceding embodiments, this disclosure is not limited to the preceding embodiments and may include other equivalent embodiments without departing from the concept of this disclosure. The scope of this disclosure is determined by the scope of the appended claims.

What is claimed is:

1. A data processing method, the method being applied to a smart wearable device and comprising:

fastening the smart wearable device to glasses worn by a target object;

determining a target function mode;

acquiring first image information captured from a viewpoint of the target object and/or first voice information of the target object based on the target function mode;

receiving data processing result information corresponding to the target function mode based on the first image information and/or the first voice information; and executing the data processing result information, wherein receiving the data processing result information corresponding to the target function mode based on the first image information and/or the first voice information comprises:

performing a first processing on the first image information to obtain second image information:

performing a second processing on the first voice information to obtain second voice information; and receiving the data processing result information corresponding to the target fonction mode based on the second image information and/or the second voice information:

wherein a central processing unit (CPU) in the smart wearable device performs image encoding and image compression in s equence on the first image information to obtain second image information, performs voice encoding on the first voice information to obtain second voice information:

wherein the data processing result information corresponding to the target function mode is generated by the host or the cloud based on the second image information and/or the second voice information.

2. The method of claim 1, wherein determining the target function mode comprises:

determining the target function mode in at least one of the following manners: smart wearable device touch control information, smart wearable device voice control information, or host operation control information;

wherein the smart wearable device touch control information comprises control information sent by touching a touch area set in the smart wearable device, and the host operation control information comprises at least one of the following: host touch control information, host button control information, or host voice control information.

3. The method of claim 1, wherein the data processing result information comprises at least one of the following: target image information, target text information, target instruction information, or target audio information; and the executing the data processing result information comprises:

in response to the data processing result information comprising the target image information and/or the target text information, displaying the target image information and/or the target text information;

in response to the data processing result information comprising the target audio information, playing the target audio information; or in response to the data processing result information comprising the target instruction information, executing the target instruction information.

4. The method of claim 3, wherein displaying the target image information and/or the target text information comprises:

generating virtual image information and/or virtual text information corresponding to the target image information and/or the target text information through a screen in the smart wearable device; and presenting the virtual image information and/or the virtual text information in a pupil of the target object through an optical assembly.

5. A data processing system, comprising a smart wearable device, a host, and a cloud, wherein the smart wearable device is configured to be fastened to glasses worn by a target object;

the smart wearable device is configured to acquire first image information captured from a viewpoint of the target object and/or first voice information of the target object based on a target function mode and send first image information and/or the first voice information to the host;

the host is configured to perform a third processing on the first image information and/or the first voice information to obtain a data processing result information corresponding to the target function mode and return the data processing result information to the smart wearable device; or forward the first image information and/or the first voice information to the cloud;

the cloud is configured to perform a fourth processing on the first image information and/or the first voice information to obtain the data processing result information corresponding to the target function mode; and return the data processing result information to the host;

the host is further configured to forward, to the smart wearable device, the data processing result information returned by the cloud; and the smart wearable device is further configured to execute the data processing result information;

wherein a central processing unit (CPU) in the smart wearable device performs image encoding and image compression in sequence on the first image information to obtain second image information, performs voice encoding on the first voice information to obtain second voice information;

wherein the data processing result information corresponding to the target function mode is generated by the host or the cloud based on the second image information and/or the second voice information.

6. The system of claim 5, wherein the host comprises a storage case; the storage case comprises a power supply circuit, a storage case screen, a processor, a communication positioning circuit, a motion data acquisition circuit, an environment sensor, a voice circuit, an image acquisition circuit, and an indicator light circuit, wherein the power supply circuit is configured to charge the smart wearable device and supply power to the storage case;

the storage case screen is configured to display operating mode information of the storage case and forward the operating mode information to the smart wearable device through the communication positioning circuit;

the processor is configured to process information sent by the smart wearable device and a motion sensor and send the processed information to the smart wearable device through the communication positioning circuit; or forward, to the cloud, the information sent by the smart wearable device;

the communication positioning circuit is configured to communicate with the smart wearable device and the cloud and is configured to acquire initial geographic location information, determine motion information based on the initial geographic location information, and transmit the motion information to the smart wearable device;

the motion data acquisition circuit is configured to acquire original motion information to determine target motion information based on the original motion information and transmit the target motion information to the smart wearable device through the communication positioning circuit;

the environment sensor is configured to detect a light intensity of a surrounding environment of the smart wearable device to adjust brightness of the smart wearable device according to the light intensity;

the voice circuit is configured to acquire voice information and control a function mode of the smart wearable device through the voice information;

the image acquisition circuit is configured to acquire image information to replace image information acquired by the smart wearable device; and the indicator light circuit is configured to display a working state of the storage case.

7. A data processing apparatus, the apparatus being applied to a smart wearable device, the smart wearable device being mounted on glasses worn by a target object, and the apparatus comprising:

one or more processors; and a storage device configured to store one or more programs;

wherein when executed by the one or more processors, the one or more programs cause the one or more processors to perform a data processing method, and the data processing method comprises:

fastening the smart wearable device to the glasses worn by the target object;

determining a target function mode;

acquiring first image information captured from a viewpoint of the target object and/or first voice information of the target object based on the target function mode;

receiving data processing result information corresponding to the target function mode based on the first image information and/or the first voice information; and executing the data processing result information;

wherein receiving the data processing result information corresponding the target function mode based on the first image information and/or the first voice information comprises:

performing a first processing on the first image information to obtain second image information;

performing a second processing on the first voice information to obtain second voice information; and receiving the data processing result information corresponding to the target function mode based on the second image information and/or the second voice information;

wherein a central processing unit (CPU) in the smart wearable device performs image encoding and image compression m sequence on the first image information to obtain second image information, performs voice encoding on the first voice information to obtain second voice information;

wherein the data processing result information corresponding to the target function mode is generated by the host or the cloud based on the second image information and/or the second voice information.

* * * * *